United States Patent [19]

Sommerfeld et al.

[11] Patent Number: 5,646,196

[45] Date of Patent: *Jul. 8, 1997

[54] C$_3$ TO C$_5$ POLYFLUORCALKANES PROPELLANTS

[75] Inventors: Claus-Dieter Sommerfeld, Overath; Wilhelm Lamberts, Cologne; Dietmar Bielefeldt, Ratingen; Albrecht Marhold, Leverkusen; Michael Negele, Cologne, all of Germany

[73] Assignee: Bayer Aktiengesellschaft, Leverkusen, Germany

[*] Notice: The term of this patent shall not extend beyond the expiration date of Pat. No. 5,496,866.

[21] Appl. No.: 592,769

[22] Filed: Jan. 26, 1996

Related U.S. Application Data

[62] Division of Ser. No. 469,622, Jan. 24, 1990, Pat. No. 5,496,866.

[30] Foreign Application Priority Data

Feb. 4, 1989 [DE] Germany .................. 39 03 336.8

[51] Int. Cl.$^6$ .................. C08J 9/00; C08G 18/00
[52] U.S. Cl. .................. 521/131; 521/78; 521/134; 521/155; 521/902
[58] Field of Search .................. 521/78, 131, 134, 521/155, 902

[56] References Cited

U.S. PATENT DOCUMENTS

| | | |
|---|---|---|
| 3,369,913 | 2/1968 | Livengood et al. . |
| 4,246,206 | 1/1981 | Mitschke et al. . |
| 4,331,778 | 5/1982 | Sommerfeld et al. . |
| 4,575,520 | 3/1986 | Kapps et al. . |
| 4,757,097 | 7/1988 | Dietrich et al. . |
| 4,931,482 | 6/1990 | Lamberts et al. . |
| 5,496,866 | 3/1996 | Sommerfield et al. .......... 521/131 |

FOREIGN PATENT DOCUMENTS

| | | |
|---|---|---|
| 0134666 | 3/1985 | European Pat. Off. . |
| 1542076 | 4/1966 | Germany . |

*Primary Examiner*—James J. Seidleck
*Assistant Examiner*—John M. Cooney, Jr.
*Attorney, Agent, or Firm*—Joseph C. Gil; Noland J. Cheung

[57] ABSTRACT

Polyfluoroalkanes are used as propellants in sprayable compositions or in the the preparation of plastic foams and in the electrical industry as cleansing and degreasing agents.

2 Claims, No Drawings

$C_3$ TO $C_5$ POLYFLUORCALKANES PROPELLANTS

This application is a division, of application Ser. No. 07/469,622 filed Jan. 24, 1990 which is now U.S Pat. No. 5,496,866.

The present invention relates to the use of $C_3$ to $C_5$ polyfluoroalkanes comprising at least two fluorine atoms as propellents, especially for aerosols and in the production of plastic foams.

The use of fluorochlorohydrocarbons, for example trichlorofluoromethane, dichlorodifluoromethane and trichlorofluoroethane, as propellents for the above purposes, is known. According to more recent studies, the chlorine content of conventional propellents damages the ozone layer of the earth's atmosphere (see J. F. D. Mills, Cell. Polym. 5, 343 (1987) and F. S. Rowland et el., Nature 239, 8 (1974)); for this reason limits have been specified for the amounts of fluorochlorohydrocarbons produced. The need has therefore arisen for chlorine-free propellents.

We have now found that those polyfluoroalkanes of the formula $$CX_3\text{---}CY_2\text{---}R \qquad (I),$$

wherein the radicals X located on the same carbon atom stand for hydrogen and/or fluorine, the radicals Y located on the same carbon atom stand for hydrogen, fluorine and/or $CF_3$, and R stands for $CH_2F$, $CHF_2$, $CH_3$, $CF_3$, $CF_2\text{---}CH_3$, $CF_2CH_2F$, $CH_2\text{---}CH_3$, $CH_2\text{---}CH_2\text{---}CH_3$ or $\text{---}CH(CH_3)\text{---}CH_3$, and wherein the polyfluoroalkanes of the formula (I) contain at least two fluorine atoms, can be used advantageously as propellants.

Those polyfluoroalkanes of the formula (I) are preferred which contain 3 to 7, particularly 4 to 6 fluorine atoms.

Furthermore, those polyfluoroalkanes of the formula (I) are preferred in which the $CX_3$ group represents a $CF_3$, $CHF_2$ or $CH_3$ group and the $CY_2$ group represents a $CH_2$, $CHF$, $CF_2$ or $C(CF_3)H$ group.

For the use according to the invention, those individual compounds conforming to formula (I) in which $X_3$, $Y_2$ and R are present in one of the combinations listed in Table 1, are particularly preferred.

TABLE 1

| $X_3$ | $Y_2$ | R |
| --- | --- | --- |
| $F_3$ | $H_2$ | $CH_2F$ |
| $F_3$ | HF | $CH_2F$ |
| $F_3$ | $H_2$ | $CHF_2$ |
| $HF_2$ | $F_2$ | $CH_2F$ |
| $F_3$ | HF | $CH_3$ |
| $H_3$ | $F_2$ | $CH_3$ |
| $F_3$ | $F_2$ | $CF_2\text{---}CH_3$ |
| $F_3$ | HF | $CF_2\text{---}CH_3$ |
| $F_3$ | $H_2$ | $CF_2\text{---}CFH_2$ |
| $F_3$ | $H_2$ | $CH_2\text{---}CH_3$ |
| $H_3$ | $F_2$ | $CF_2\text{---}CH_3$ |
| $F_3$ | $H_2$ | $CF_2\text{---}CH_3$ |
| $F_3$ | $HCF_3$ | $CH_3$ |
| $F_3$ | $H_2$ | $CH_2\text{---}CH_2\text{---}CH_3$ |
| $F_3$ | $H_2$ | $\text{---}CH(CH_3)\text{---}CH_3$ |
| $F_3$ | $H_2$ | $CF_3$ |

The methods for preparing the polyfluoroalkanes for use according to the invention are known (see, for example, Zh. Org. Khim. 1980, 1401–1408 and 1982, 946 and 1168; Zh. Org. Khim. 1988, 1558; J. Chem. Soc. Perk. 1, 1980, 2258; J. Chem. Soc. Perk. Trans. 2, 1983, 1713; J. Chem. Soc. C 1969, 1739; Chem. Soc. 1949, 2860; Zh. Anal. Khim. 1981 36 (6), 1125; J. Fluorine Chem. 1979, 325; Izv. Akad. Nauk. SSSR, Ser. Khim. 1980, 2117 (in Russian); Rosz. Chem. 1974 (48), 1697 and J. A. C. S. 67, 1195 (1945), 72, 3577 (1950) and 76, 2343 (1954)).

The propellants for use according invention are particularly suitable for aerosols and production of plastic foams; the individual compounds of the formula (I), mixtures of compounds of the formula and mixtures of compounds Of the formula (I) with conventional propellants may be used for this purpose. Individual compounds of the formula (I) or mixtures of compounds of the formula (I) are preferred.

Suitable aerosols are those employed for cosmetic and medicinal purposes, for example deodorant aerosols, anti-asthma sprays end liquid plaster sprays. Aerosols which employ the propellants for use according to the invention, are distinguished by the fact that the propellant is inert and the ozone layer of the earth's atmosphere is no longer negatively affected by the corresponding amount of propellants according to the invention, since they are chlorine-free.

The methods of producing plastic foams using propellants is generally known. In the production of closed-cell foams the propellants may also act as heat-insulating cellular gases. This is also true for the propellants for use according to the invention.

The propellants for use according to the invention may be employed, for example, in the production of foams based on isocyanates, polystyrenes, polyvinyl chlorides end phenolformaldehyde condensates. They are preferably used in the production of foams based on isocyanates, in particular in the production of polyurethane and/or polyisocyanurate foams they are especially preferred in the production of rigid foams based on isocyanates.

The production of foams based on isocyanates is known per se and is described, for example, in German Offenlegungsschriften 1,694,142, 1,694,215 and 1,720,768, as well as in Kunststoff-Handbuch [Plastics Handbook], volume VII, Polyurethane, edited by Viewag and Höchtlen, Carl Hanser Verlag, Munich 1966, and in the new edition of this tome, edited by G. Oertel, Carl Hanser Verlag, Munich, Vienna, 1983.

These foams are mainly those comprising urethane and/or isocyanurate and/or allophanate and/or uretdione and/or urea and/or carbodiimide groups.

The following can be employed for the production of foams based on isocyanates, using propellants according to the invention:

a) As starting components altphatic, cycloaliphatic, araliphatic, aromatic and heterocyclic polyisocyanates, such as those described, for example, by W. Siefken in Justus Liebigs Annalan der Chemie, 562, pp. 75–136, for example those of the formula $$Q(NCO)_n$$

in which n denotes 2–4 ,preferably 2–3, and

Q denotes an aliphatic hydrocarbon radical of 2–18, preferably 6–10 carbon atoms, a cycloaliphatic hydrocarbon radical of 4–15, preferably 5–10 carbon atoms, an aromatic hydrocarbon radical of 6–15, preferably 6–13 Carbon atoms or an arallphatic hydrocarbon radical of 8–15, preferably 8–13 carbon atoms, for example such polyisocyanates as described in DE-OS 2,832,253, pp. 10–11. Particularly preferred are usually those polyisocyanates which are technically readily accessible, for example the 2,4- and 2,6-toluylene diisocyanate as well as any mixture of these isomers ("TDI"); polyphenylpolymethylenepolyisocyanates, such as those obtained by an aniline-formaldehyde condensation end subsequent treatment with phosgene ("crude MDI"), and polyisocyanates comprising carbodiimide groups, urethane groups, allophanate groups, isocyanurate groups, urea groups or biuret groups ("modified polyisocyanates"), especially those modified polyisocyanates which are derived from 2,4- and/or 2,6-toluylene diisocyanate and from 4,4'- and/or 2,4'-diphenylmethane diisocyanate.

b) The starting components may further be compounds of a molecular weight usually of 400 to 10,000, containing at least two hydrogen atoms reactive toward isocyanates. These comprise, besides compounds containing amino, thio or carboxyl groups, preferably compounds containing hydroxyl groups, in particular compounds containing 2 to 8 hydroxyl groups, especially those of a molecular weight of 1,000 to 6,000, preferably 2,000 to 6,000, for example polyethers and polyesters as well as polycarbonates and polyester amides containing at least 2, usually 2 to 8, preferably 2 to 6 hydroxyl groups; these compounds are known per se for the preparation of homogeneous and cellular polyurethanes and are disclosed, for example, in DE-OS 2,832,253, pp. 11–18.

c) When appropriate, compounds comprising at least two hydrogen atoms reactive toward isocyanates and of a molecular weight of 32 to 399 maybe used as further starting components. Also in this case compounds containing hydroxyl groups and/or amino groups and/or thiol groups and/or carboxyl groups, preferably compounds containing hydroxyl groups and/or amino groups, are understood to be those which are used as chain lengtheners or crosslinking agents. These compounds usually have 2 to 8, preferably 2 to 4 hydrogen atoms reactive toward isocyanates. Appropriate examples are disclosed in DE-OS 2,832,253, pp. 19–20.

d) One polyfluoroalkane or several polyfluoroalkanes of the formula (I) as propellant and insulating gas, if appropriate in admixture with conventional propellants and insulating gases.

e) When appropriate, other auxiliary agents and additives may be used at the same time, such as
water and/or other highly volatile organic substances as propellants,
additional catalysts of the type known per se in amounts up to 10% by weight, based on the component b),
surface-active additives, such as emulsifiers and foam stabilizers,
reaction retardants, for example acidic substances such as hydrochloric acid or organic acid halides, also cell regulators of the type known per se such as paraffins or fatty alcohols or dimethylpolysiloxanes as well as pigments or dyes and other flame retardants of the type known per se, for example tricresyl phosphate, also stabilizers against the effects of ageing and weathering, plasticizers and fungistats and bacteriostats as well as fillers such as barium sulphate, kieselguhr, carbon black or whiting.

Other examples of surface active additives, foam stabilizers, cell regulators, reaction retardants, stabilizers, flame retardants, plasticizers, dyes, fillers, fungistats, bacteriostats to be used at the same time if appropriate, as well as details concerning the use and action of these additives are described in Kunststoff-Handbuch [Plastics Handbook], volume VII, edited by Viewag and Höchtlen, Carl Hanser Verlag, Munich 1966, for example on pages 103–113.

The isocyanate-based foams can be prepared in a manner known per se.

The preparation of polyurethane plastics may be prepared, for example, as follows: the reactants are caused to react by the single-stage process known per se, the prepolymer process or the semiprepolymer process, frequent use being made of plant machinery, for example that disclosed in U.S. Pat. No. 2,764,565. Details concerning the processing plant which are likewise relevant according to the invention, are described An Kunststoff-Handbuch, volume VII, edited by Viewag and Höchtlen, Carl Hanser Verlag, Munich 1966, for example on pages 121 to 205.

According to the invention it is also possible to produce cold-curing foams (cf. GB-PS 1,162,517, DE-OS 2,153, 086).

Foams may of course also be produced by block foaming or by the double conveyor belt process known per se.

The products obtainable according to the invention may be used, for example, as insulation panels for roof insulation.

In foam production, the propellents for use according to the invention may be employed, for example, in amounts of 1 to 30% by weight, preferably 2 to 10% by weight, in each case based on the foam.

Compared with conventional foams of similar or virtually identical cell structure, foams produced by propellents for use according to the invention are distinguished by the fact that in their production, application and disposal they no longer negatively affect the ozone layer of the earth's atmosphere by the responding amount of the propellents according to the invention.

Polyfluoroalkanes of the formula (I) may be further employed as degreasing and cleansing agents in the electrical industry. The same polyfluoroalkanes are preferred for this purpose as those referred to above as being preferred. Here, too, the individual compounds of the formula (I), mixtures of compounds of the formula (I) and mixtures of compounds of the formula (I) with conventional degreasing and cleansing agents may be employed.

EXAMPLE 1

100 g of a polyether with a hydroxyl value of 380, which has resulted from the addition of propylene oxide to a solution of saccharose, propylene glycol and water,
2 g of a siloxane polyether copolymer as foam stabilizer,
3.8 g of water and
3 g of dimethylcyclohexylamine were mixed.
100 g of this mixture were thoroughly mixed with
15 g of 1,1,1,3,3,3-hexafluoro-2-methylpropane as propellant, using a laboratory stirrer.

This mixture was foamed with 152 g of crude 4,4'-diisocyanatodiphenylmethane. A rigid polyurethane foam was obtained. Foaming and physical data:

| | |
|---|---|
| Induction time (s): | 10 |
| Setting time (s): | 42 |
| Free density (kg/m$^3$): | 24 |
| Cell structure: | fine |

EXAMPLE 2

100 g of a polyether with a hydroxyl value of 380 which results from the addition of propylene oxide to a solution of saccharose, propylene glycol and water, 2 g of a siloxane polyether copolymer as foam stabilizer, 3.8 g of water and 3 g of dimethylcyclohexylamine were mixed.

100 g of this mixture were thoroughly mixed with 15 g of 1,1,1,3,3,3-hexafluoropropane as propellant, using a laboratory stirrer.

This mixture was foamed with 152 g of crude 4,4'-diisocyanatodiphenylmethane. A rigid polyurethane foam was obtained. Foam and physical data:

| | |
|---|---|
| Induction time (s): | 10 |
| Setting time (s): | 40 |
| Free density (kg/m$^3$): | 22 |
| Cell structure: | fine. |

EXAMPLE 3

100 g of a polyether with a hydroxyl value of 380 which results from the addition of propylene oxide to a solution of saccharose, propylene glycol and water, 2 g of a siloxane polyether copolymer as foam stabilizer, 3.8 g of water and 3 g of dimethylcyclohexylamine were mixed.

100 g of this mixture were thoroughly mixed with 15 g of 2,2,4,4-tetrafluorobutane as propellant, using a laboratory stirrer.

This mixture was foamed with 152 g of crude 4,4'-diisocyanatodiphenylmethane. A rigid polyurethane foam was obtained. Foaming and physical data:

| | |
|---|---|
| Induction time (s): | 10 |
| Setting time (s): | 39 |
| Free density (kg/m$^3$): | 21 |
| Cell structure: | fine. |

EXAMPLE 4

60 g of a polyether with a hydroxyl value of 950 which resulted from the addition of propylene oxide to trimethylpropane, 40 g of a polyether with a hydroxy value of 56 which resulted from the addition of propylene oxide to trimethylpropane, 0.5 g of water and 2 g of a siloxane polyether copolymer as foam stabilizer were mixed.

100 g of this mixture was thoroughly mixed with 10 g of 1,1,1,3,3,3-hexafluoro-2-methylpropane as propellant, using a laboratory stirrer.

This mixture was foamed with 164 g of crude 4,4'-diisocyanatodiphenylmethane. A rigid solid polyurethane plastic was obtained. Foaming and physical data:

| | |
|---|---|
| Induction time (s): | 75 |
| Setting time (s): | 120 |
| Free density (kg/m$^3$): | 75 |
| Total density compacted (kg/m$^3$): | 350 |
| Cell structure: | fine. |

EXAMPLE 5

60 g of a polyether with a hydroxyl value of 950 Which resulted from the addition of propylene oxide to trimethylpropane, 40 g of a polyether with a hydroxy value of 56, which resulted from the addition of propylene oxide to trimethylolpropane, 0.5 g of water and 2 g of a siloxane polyether copolymer as foam stabilizer were mixed.

100 g of this mixture were thoroughly mixed with 10 g of the 1,1,1,3,3,3-hexafluoropropane according to the invention as propellant, using a laboratory stirrer.

This mixture was foamed with 164 g of crude 4,4'-diisocyanatodiphenylmethane. A rigid solid polyurethane plastic was obtained. Foaming and physical data:

| | |
|---|---|
| Induction time (s): | 88 |
| Setting time (s): | 136 |
| Free density (kg/m$^3$): | 70 |
| Total density compacted (kg/m$^3$): | 350 |
| Cell structure: | fine. |

EXAMPLE 6

60 g of a polyether with a hydroxyl value of 950 which resulted from the addition of propylene oxide to trimethylolpropane, 40 g of a polyether with a hydroxyl value of 56 which resulted from the addition of propylene oxide to trimethylolpropane, 0.5 g of water and 2g of a siloxane polyether copolymer as foam stabilizer were mixed.

100 g of this mixture were thoroughly mixed with 10 g of 2,2,4,4-tetrafluorobutane as propellant, using a laboratory stirrer.

This mixture was foamed with 164 g of crude 4,4'-diisocyanatodiphenylmethane. A rigid solid polyurethane plastic was obtained. Foaming and physical data:

| | |
|---|---|
| Induction time (s): | 83 |
| Setting time (s): | 138 |
| Free density (kg/m$^3$): | 68 |
| Total density compacted (kg/m$^3$): | 350 |
| Cell structure: | fine. |

EXAMPLE 7

91 of a polyether with a hydroxyl value of 56 which resulted from the addition of propylene oxide to trimethylolpropane, 9 of monoethylene glycol and 0.1 g of water were mixed.

100 g of this mixture were thoroughly mixed with 15 g of 1,1,1,3,3,3-hexafluoro-2-methylpropane as propellant, using a laboratory stirrer.

This mixture was foamed with 56 g of crude 4,4'-diisocyanatodiphenylmethane. A tough and resilient polyurethane foam was obtained. Foaming and physical data:

| | |
|---|---|
| Induction time (s): | 33 |
| Setting time (s): | 112 |
| Free density (kg/m$^3$): | 131 |
| Total density compacted (kg/m$^3$): | 350 |
| Cell structure: | fine. |

EXAMPLE 8

91 g of a polyether with a hydroxyl value of 56, which resulted from the addition of propylene oxide to trimethylolpropane, 9 g of monoethylene glycol and
0.1 g of water were mixed.
100 g of this mixture were thoroughly mixed with
15 g of 1,1,1,3,3,3-hexafluoropropane as propellant, using a laboratory stirrer.
This mixture was foamed with 56 g of crude 4,4'-diisocyanatodiphenylmethane. A tough and resilient polyurethane foam was obtained. Foaming and physical data:

| Induction time (s): | 36 |
|---|---|
| Setting time (s): | 108 |
| Free density (kg/m³): | 121 |
| Cell structure: | fine. |

EXAMPLE 9

91 g of a polyether with a hydroxyl value of 56, which resulted from the addition of propylene oxide to trimethylolpropane,
9 g of monoethylene glycol and
0.1 g of water were mixed.
100 g of this mixture were thoroughly mixed with
15 g of 2,2,4,4-tetrafluorobutane as propellant, using a laboratory stirrer.
This mixture was foamed with 56 g of crude 4,4'-diisocyanatodiphenylmethane. A tough and resilient polyurethane foam was obtained. Foaming and physical data:

| Induction time (s): | 38 |
|---|---|
| Setting time (s): | 108 |
| Free density (kg/m³): | 117 |
| Cell structure: | fine |

EXAMPLE 10

100 g of e polyether with a hydroxyl value of 56, which resulted from the addition of propylene oxide to trimethylolpropane,
3 g of water,
1 g of-a siloxane polyether copolymer as foam stabilizer,
0.05 g of dibutyltin dilaurate were mixed.
100 g of this mixture were thoroughly mixed with
10 g of 1,1,1,3,3,3-hexafluoro-2-methylpropane as propellants, using a laboratory stirrer.
This mixture was foamed with 41 g of toluylene diisocyanate. A flexible polyurethane foam was obtained. Foaming and physical dates

| Induction time (s): | 8 |
|---|---|
| Setting time (s): | 105 |
| Free density (kg/m³): | 28 |
| Cell structure: | fine. |

EXAMPLE 11

100 g of a polyether with a hydroxyl value of 56, which resulted from the addition of propylene oxide to trimethylolpropane,
3 g of water,
1 g of a siloxane polyether copolymer as foam stabilizer,
0.05 g of dibutyltin dilaurate were mixed.
100 g of this mixture were thoroughly mixed with
10 g of 1,1,1,3,3,3-hexafluoropropane as propellant, using a laboratory stirrer.
This mixture was foamed with 41 g of toluylene diisocyanate. A flexible polyurethane foam was obtained. Foaming end physical data:

| Induction time (s): | 8 |
|---|---|
| Setting time (s): | 103 |
| Free density (kg/m³): | 26 |
| Cell structure: | fine. |

EXAMPLE 12

100 g of a polyether with a hydroxy value of 56, which resulted from the addition of propylene oxide to trimethylolpropane, 3 g of water, 1 g of a siloxane polyether copolymer as foam stabilizer, 0.05 g of dibutyltin dilaurate were mixed.

100 g of this mixture were thoroughly mixed with 10 g of 2,2,4,4-tetrafluorobutane as propellant, using a laboratory stirrer.

This mixture was foamed with 41 g of toluylene diisocyanate. A flexible polyurethane foam was obtained. Foaming and physical data:

| Induction time (s): | 8 |
|---|---|
| Setting time (s): | 108 |
| Free density (kg/m³): | 25 |
| Cell structure: | fine. |

What is claimed is:

1. A method of forming plastic foam compositions comprising foaming a plastic based on isocyanate in the presence of a propellant the improvement wherein the propellant comprises a polyfluoroalkane of the formula:

$$CHF_2-CF_2-CFH_2.$$

2. A closed cell plastic foam composition prepared by foaming a plastic material based on isocyanate in the presence of a propellant the improvement wherein the propellant comprises a polyfluoroalkane of the formula:

$$CHF_2-CF_2-CFH_2.$$

* * * * *

UNITED STATES PATENT AND TRADEMARK OFFICE
CERTIFICATE OF CORRECTION

PATENT NO. : 5,646,196
DATED : July 8, 1997
INVENTOR(S) : Claus-Dieter Sommerfeld et al It is certified that error appears in the above-indentified patent and that said Letters Patent is hereby corrected as shown below:

On the title page item [54], in the title, delete "POLYFLUORCALKANES" and insert --POLYFLUOROALKANES--.

At column 1, line 1, in the title, delete "POLYFLUORCALKANES" and insert --POLYFLUOROALKANES--.

At column 2, line 8, after "according" and before "invention" insert --to the--.

At column 2, line 11, after "formula", insert --(I)--.

At column 2, line 17, delete "end" and insert --and--.

At column 2, line 30, delete "end" and insert --and--.

At column 2, line 34, after "foams" insert --;--.

At column 2, line 50, delete "altphatic" and insert --aliphatic--.

At column 2, line 64, delete "arallphatic" and insert --araliphatic--.

At column 3, line 7, delete "end" and insert --and--.

UNITED STATES PATENT AND TRADEMARK OFFICE
CERTIFICATE OF CORRECTION

PATENT NO. : 5,646,196

DATED : July 8, 1997

INVENTOR(S) : Claus-Dieter Sommerfeld et al

It is certified that error appears in the above-indentified patent and that said Letters Patent is hereby corrected as shown below:

At column 3, line 32, delete "maybe" and insert --may be--.

At column 4, line 16, delete "An" and insert --in--.

At column 6, line 1, delete "hydroxy" and insert --hydroxyl--.

At column 7, line 37, before "polyether", delete "e" and insert --a--.

At column 8, line 22, delete "hydroxy" and insert --hydroxyl--.

Signed and Sealed this

Eleventh Day of November, 1997

Attest:

BRUCE LEHMAN

Attesting Officer

Commissioner of Patents and Trademarks